United States Patent
Ting et al.

(10) Patent No.: US 10,236,796 B2
(45) Date of Patent: Mar. 19, 2019

(54) SINGLE HYBRID MOTOR, DUAL HYBRID MOTOR AND HYBRID MOTOR ASSEMBLY

(71) Applicant: Chung-Yuan Christian University, Chung Li, Tao Yuan County (TW)

(72) Inventors: Yung Ting, Chung Li (TW); Sheuan-Perng Lin, Chung Li (TW); Kai-Chao Chang, Chung Li (TW); Jia-Ci Chen, Chung Li (TW)

(73) Assignee: CHUNG-YUAN CHRISTIAN UNIVERSITY, Chung Li, Tao Yuan County (TW)

( * ) Notice: Subject to any disclaimer, the term of this patent is extended or adjusted under 35 U.S.C. 154(b) by 439 days.

(21) Appl. No.: 15/149,792

(22) Filed: May 9, 2016

(65) Prior Publication Data

US 2017/0063258 A1    Mar. 2, 2017

(30) Foreign Application Priority Data

Aug. 27, 2015    (TW) .............................. 104128098 A (51) Int. Cl.
| | | |
|---|---|---|
| *H01L 41/09* | (2006.01) | |
| *H02N 2/00* | (2006.01) | |
| *H02K 7/00* | (2006.01) | |
| *H02K 7/08* | (2006.01) | |

(52) U.S. Cl.
CPC ........... *H02N 2/0045* (2013.01); *H02K 7/003* (2013.01); *H02K 7/08* (2013.01)

(58) Field of Classification Search
CPC . G06B 3/00; H02K 7/003; H02K 7/08; H02N 2/0045

USPC .......................................... 310/311–371, 800
See application file for complete search history.

(56) References Cited

U.S. PATENT DOCUMENTS

| | | | | |
|---|---|---|---|---|
| 4,947,076 A | * | 8/1990 | Kumada | H02N 2/0045 310/323.02 |
| 4,965,482 A | * | 10/1990 | Ohnishi | H02N 2/106 310/323.13 |
| 5,825,118 A | * | 10/1998 | Okazaki | H01L 41/0906 310/323.12 |
| 6,737,776 B1 | * | 5/2004 | Teter | H01L 41/12 310/76 |
| 2002/0005682 A1 | * | 1/2002 | Kato | H02N 2/0045 310/333 |
| 2004/0145275 A1 | * | 7/2004 | Komoda | H02N 2/106 310/323.13 |

* cited by examiner

*Primary Examiner* — Thomas M Dougherty
(74) *Attorney, Agent, or Firm* — Muncy, Geissler, Olds & Lowe, P.C.

(57) ABSTRACT

A single hybrid motor of the present invention has a rotor, a first stator, a first torsional vibrator, a first longitudinal vibrator, a first template, and a first connecting element. One end of the first connecting element is connected with the rotor, the first torsional vibrator, the first longitudinal vibrator, the first template, the first elastic block and the second elastic block. The first elastic block is disposed between the rotor and the first torsional vibrator. The second elastic block is disposed between the first template and the first longitudinal vibrator. Adjusting the length of the first elastic block or/and the second elastic block allows the first torsional vibrator and the first longitudinal vibrator of the single hybrid motor to obtain a plurality of sets of resonance frequencies within a degeneracy range.

10 Claims, 14 Drawing Sheets

# SINGLE HYBRID MOTOR, DUAL HYBRID MOTOR AND HYBRID MOTOR ASSEMBLY

BACKGROUND OF THE INVENTION

1. Field of the Invention

The present invention relates to single hybrid motor, a dual hybrid motor and a hybrid motor assembly, and more particularly to a single hybrid motor that can be operated separately itself or co-operate with a detachable stator to form a dual hybrid motor; and to a hybrid motor assembly formed by butting a plurality of single hybrid motors.

2. Description of the Related Art

The piezoelectric effect is achieved by deforming a material to convert mechanical energy into electrical energy, or vice versa. Since the piezoelectric characteristics of BaTiO3 were discovered in 1942, various areas of research and applications related to piezoelectric materials have been developed. A sandwich-type converter assembled with a quartz crystal and a steel plate was developed by A. Langevin in 1917 for converting electricity into supersonic mechanical vibrations, initiating the application of piezoelectric materials to sonic waves. Generally speaking, a hybrid transducer is formed by a single stator with a single rotor. In order to manipulate the single hybrid motor, it is essential to identify the resonance frequency of the longitudinal vibrator and the torsional vibrator within the stator, called degeneracy. However, it is difficult to attain degeneracy for a single hybrid motor developed recently, and only a single set of resonance frequencies can be identified. Therefore, the single hybrid motor has limited application fields and must be improved.

SUMMARY OF THE INVENTION

It is an object of the present invention to provide a single hybrid motor whose degeneracy process can be achieved easily and which has a plurality of sets of resonance frequencies available that can be obtained by adjusting the length of the elastic block within the stator.

It is an object of the present invention to provide a dual hybrid motor formed by a single hybrid motor with a detachable stator, wherein the output speed and the output torsion of the dual hybrid motor can be increased by modifying the control signals applied to the two stators.

To achieve the abovementioned objects, the single hybrid motor of the present invention comprises a rotor, a first stator, a first torsional vibrator, a first longitudinal vibrator, a first template, and a first connecting element. One end of the first connecting element is connected with the rotor, the first torsional vibrator, the first longitudinal vibrator, the first template, the first elastic block and the second elastic block. The first elastic block is disposed between the rotor and the first torsional vibrator. The second elastic block is disposed between the first template and the first longitudinal vibrator. When the length of the first elastic block or/and the second elastic block is adjusted, the first torsional vibrator and the first longitudinal vibrator of the single hybrid motor can obtain a plurality of sets of resonance frequencies within a degeneracy range.

The present invention further provides a dual hybrid motor comprising the above-mentioned single hybrid motor and a second stator, wherein the second stator detachably connects with the single hybrid motor. The second stator comprises a second torsional vibrator, a second longitudinal vibrator, a second template and a second connecting element. The second connecting element detachably connects to another end of the first connecting element and is connected with the second torsional vibrator, the second longitudinal vibrator and the second template. When the dual hybrid motor operates under a first control mode, an output torsion of the dual hybrid motor is greater than that of the single hybrid motor. When the dual hybrid motor operates under a second control mode, an output speed of the dual hybrid motor is greater than that of the single hybrid motor.

According to one embodiment of the present invention, the first control mode refers to a same phase control; i.e., the same phase control signals are applied to the first stator and the second stator individually. The second control mode refers to reverse phase control; i.e., control signals with 180° of phase difference are applied to the first stator and the second stator individually.

The present invention further provides a hybrid motor assembly formed by butting a plurality of the above-mentioned single hybrid motors.

DETAILED DESCRIPTION OF THE PREFERRED EMBODIMENT

The technical aspects of the invention will become more apparent from the following detailed description of a preferred embodiment. Please refer to FIG. 1A, FIG. 1B, and FIG. 2 to FIG. 5, which are related to the first embodiment of the single hybrid motor and the dual hybrid motor, the partial exploded view of the first embodiment of the dual hybrid motor, an exploded drawing showing the first embodiment of the dual hybrid motor, a section view of the first embodiment of the dual hybrid motor, the output of the dual hybrid motor under the first control mode, and the output of the dual hybrid motor under the second control mode.

Figure 1A:
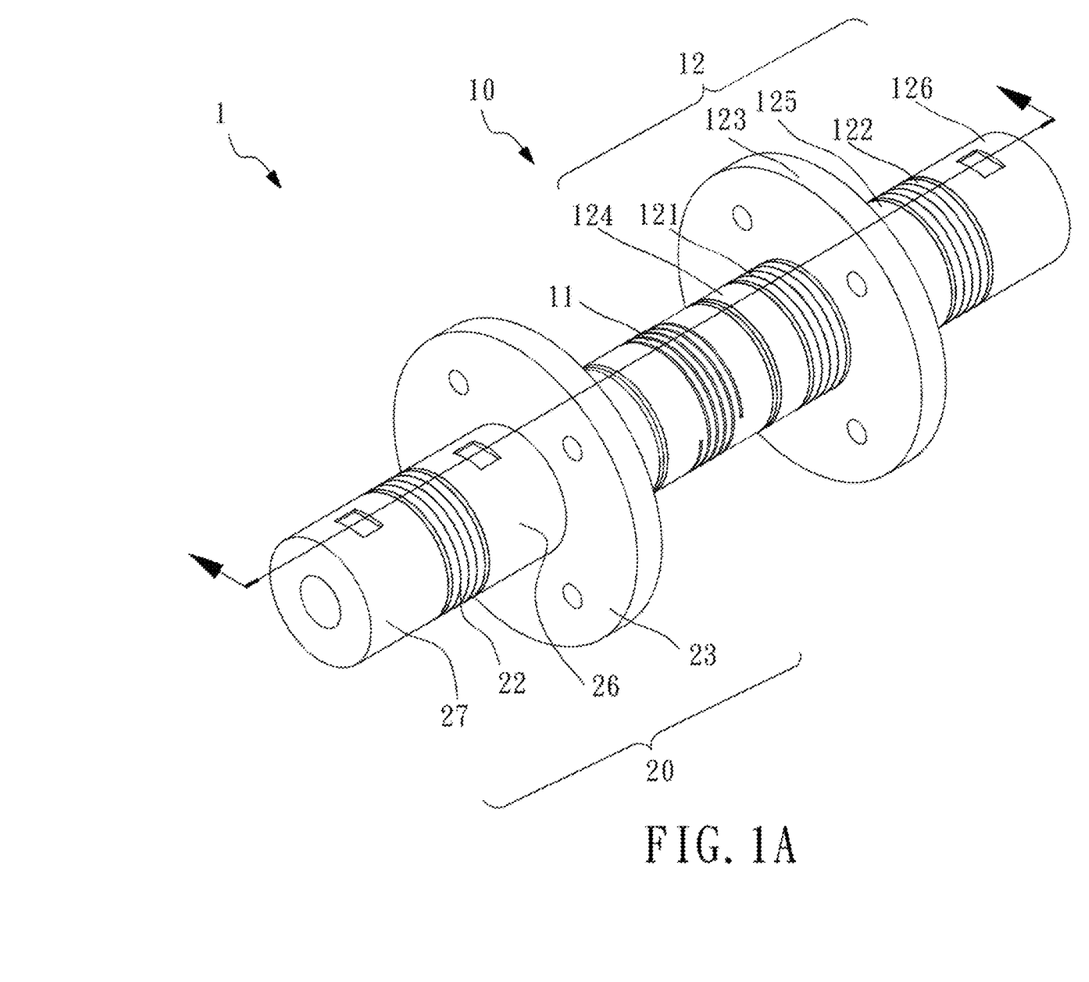
FIG. 1A is a schematic drawing showing a first embodiment of the dual hybrid motor.
Figure 1B:
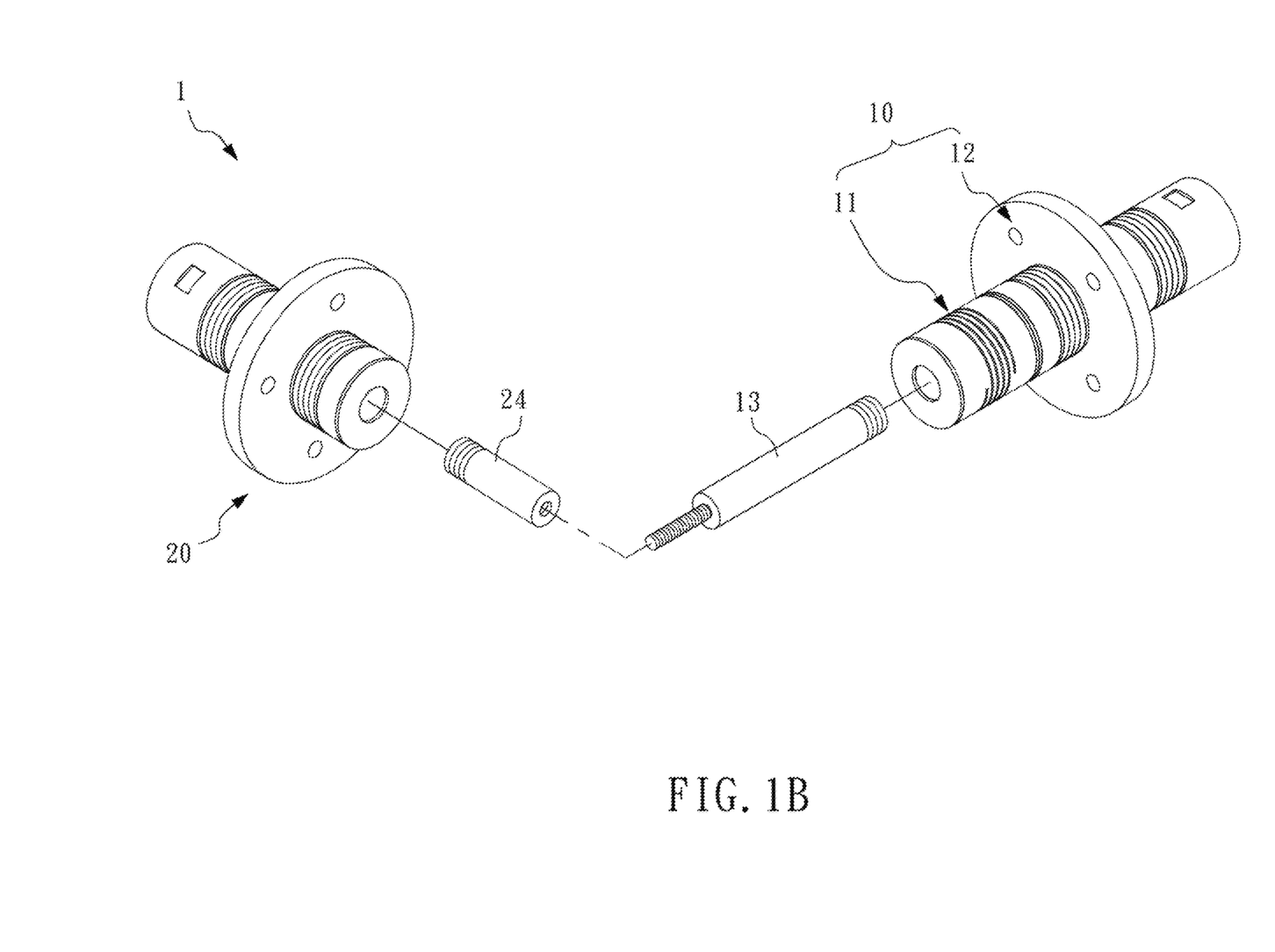
FIG. 1B is a schematic drawing showing the single hybrid motor and a partial exploded view of the first embodiment of the dual hybrid motor.
Figure 2:
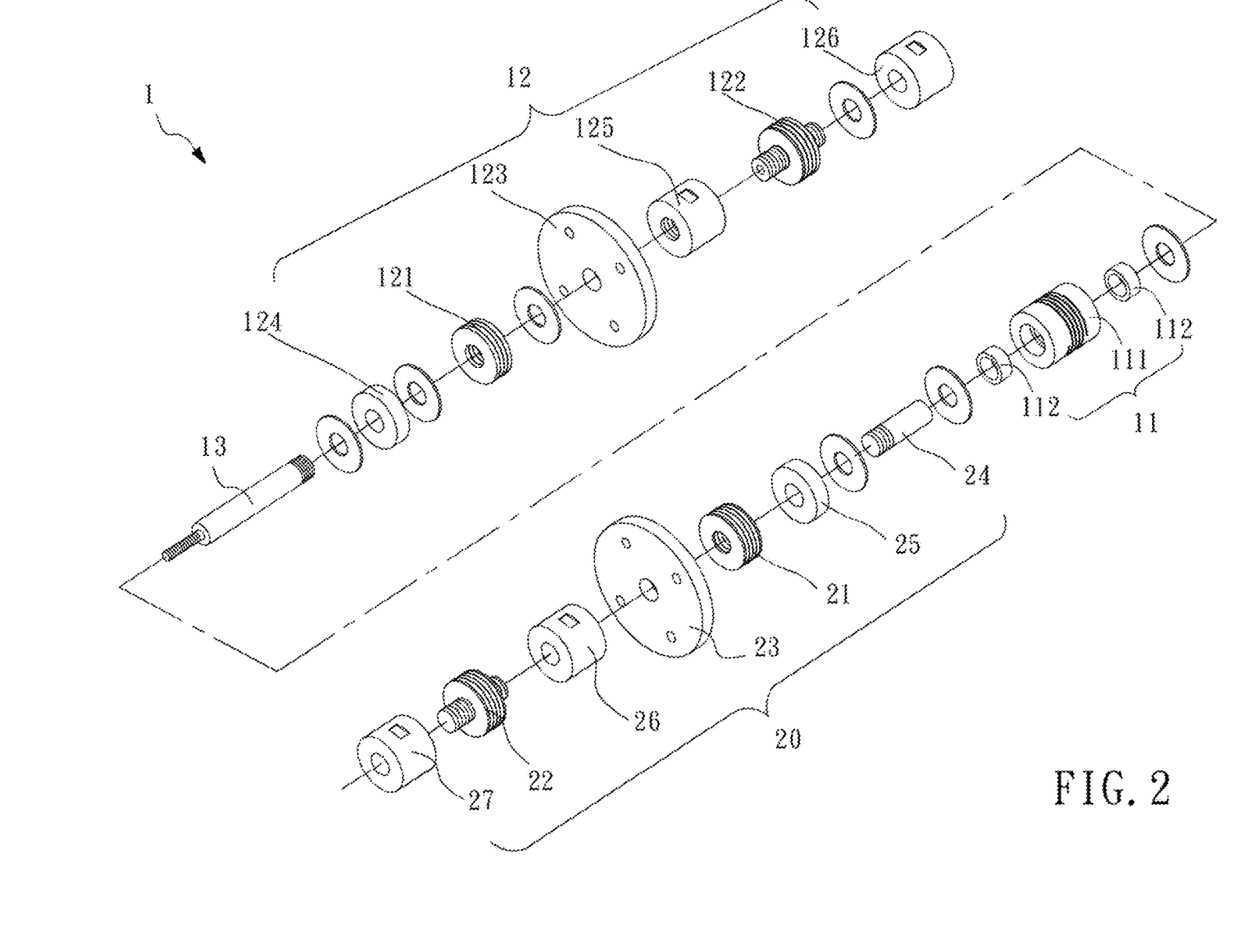
FIG. 2 is an exploded drawing showing the first embodiment of the dual hybrid motor.

As shown in FIG. 1A, FIG. 1B and FIG. 2, the single hybrid motor 10 comprises a rotor 11, a first stator 12 and a first connecting element 13. The first stator 12 is disposed at one side of the rotor 11. In the present embodiment, the rotor 11 comprises a coupling 111 and a bearing 112. The first stator 11 comprises a first torsional vibrator 121, a first longitudinal vibrator 122, a first template 123, a first elastic block 124, a second elastic block 125 and a third elastic block 126. The first template 123 is disposed between the first longitudinal vibrator 122 and the first torsional vibrator 121 for separating the two, and the interference between the first longitudinal vibrator 122 and the first torsional vibrator 121 can be reduced consequently. According to an embodiment of the present invention, the first template 123 is a disk-like metal plate.

One end of the first connecting element 13 is connected with the rotor 11, the first torsional vibrator 121, the first longitudinal vibrator 122, the first template 123, the first elastic block 124, the second elastic block 125 and the third elastic block 126. The first elastic block 124 is disposed between the rotor 11 and the first torsional vibrator 121. The second elastic block 125 is disposed between the first template 123 and the first longitudinal vibrator 122. The third elastic block 126 is disposed at an end of the first longitudinal vibrator 122 which is away from the first template 123. According one embodiment of the present invention, the length of the first elastic block 124 is 4-10 mm, and the length of the second elastic block 125 is 17-23 mm; however, the present invention is not limited to those dimensions. The length of the first elastic block 124 can also be 4-13 mm, and the length of the second elastic block 125 can be 18-28 mm. The first elastic block 124, the second elastic block 125, and the third elastic block 126 all are made of stainless steel, and the length of the second elastic block 125 is equal to the length of the third elastic block 126.

Figure 3:
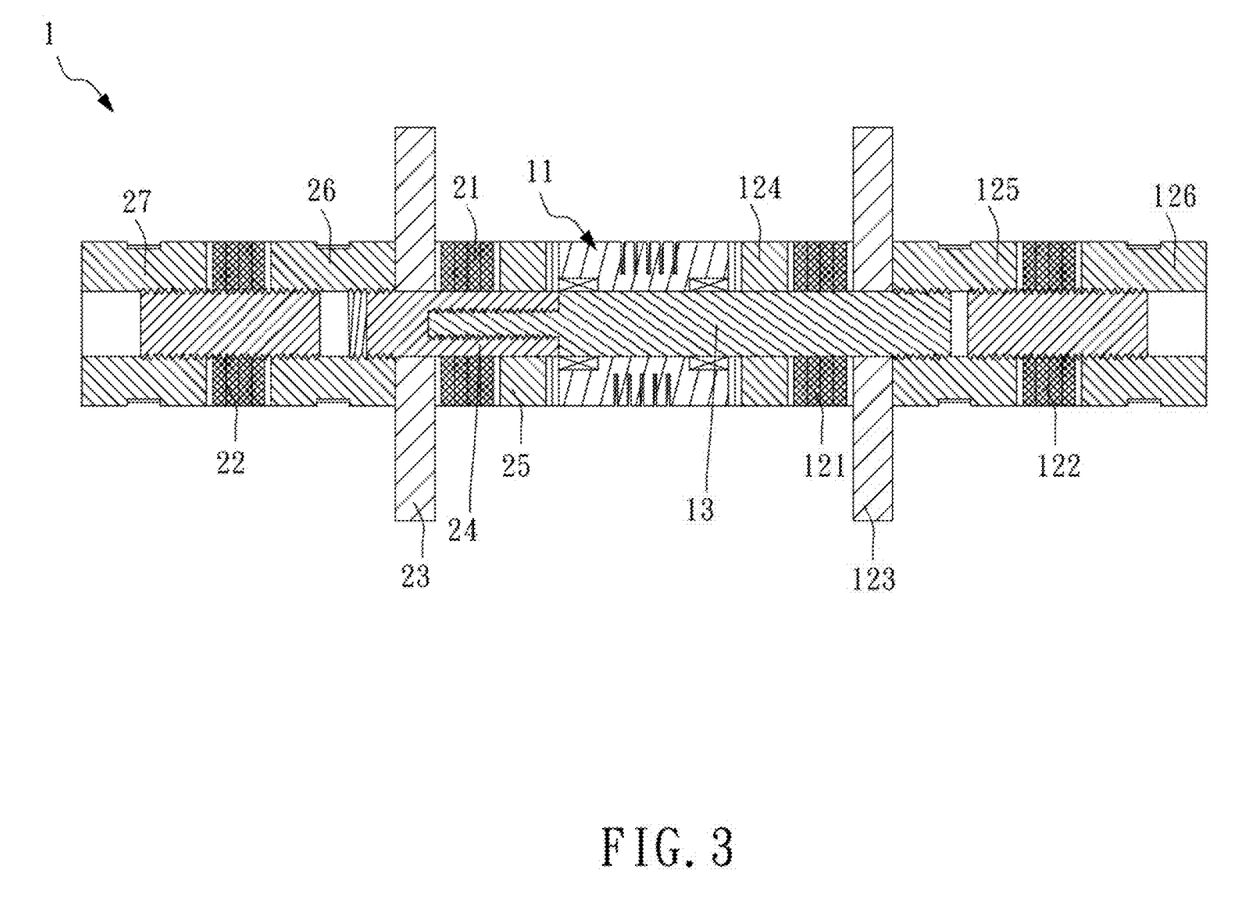
FIG. 3 is a schematic drawing showing a section view of the first embodiment of the dual hybrid motor.

As shown in FIG. 1A, FIG. 1B and FIG. 2, the dual hybrid motor 1 comprises the above-mentioned single hybrid motor 10 and a second stator 20, wherein the second stator 20 detachably connects with the single hybrid motor 10. As shown in FIG. 1B, FIG. 2 to FIG. 3, the second stator 20 and the first stator 12 are disposed at opposite sides of the rotor 11. The second stator 20 comprises a second torsional vibrator 21, a second longitudinal vibrator 22, a second template 23, a second connecting element 24, a first elastic block 25, a second elastic block 26 and the third elastic block 27. The second template 23 is disposed between the second longitudinal vibrator 22 and the second torsional vibrator 21 for separating the two and reducing the interference between the second longitudinal vibrator 22 and the second torsional vibrator 21.

The second connecting element 24 detachably connects with the other end of the first connecting element 13, and the second connecting element 24 is connected with the second torsional vibrator 21, the second longitudinal vibrator 22, the second template 23, the first elastic block 25, the second elastic block 26 and the third elastic block 27. The first elastic block 25 is disposed between the rotor 11 and the second torsional vibrator 21. The second elastic block 26 is disposed between the second template 23 and the second longitudinal vibrator 22. The third elastic block 27 is disposed at an end of the second longitudinal vibrator 22 which is away from the second template 23. According to one embodiment of the present invention, the length of the first elastic block 25 is 4-10 mm, and the length of the second elastic block 26 is 17-23 mm. According to one embodiment of the present invention, the first elastic block 25, the second elastic block 26, and the third elastic block 27 are all made of stainless steel, and the length of the second elastic block 26 is equal to the length of the third elastic block 27. If the length of the first elastic block 25 or/and the length of the second elastic block 26 is adjusted, the degeneracy range of the second stator 20 and the degeneracy range of the single hybrid motor 10 can be overlapped in order to obtain a plurality of sets of resonance frequencies available for driving the dual hybrid motor 1.

In the present embodiment, the second connecting element 24 is a hollow bolt for covering the thread end of the first connecting element 13 for facilitating the connection of the second stator 20 with the single hybrid motor 10. According to one embodiment of the present invention, the second template 23 is a disc-like metal plate. The dual hybrid motor 1 can operate under a first control mode or a second control mode, wherein the first control mode refers a same phase control; i.e., same phase control signals are applied to the first stator 12 and the second stator 20 individually. The second control mode refers to a reverse phase control; i.e., control signals with 180° of phase difference are applied to the first stator 12 and the second stator 20 individually.

Figure 4:
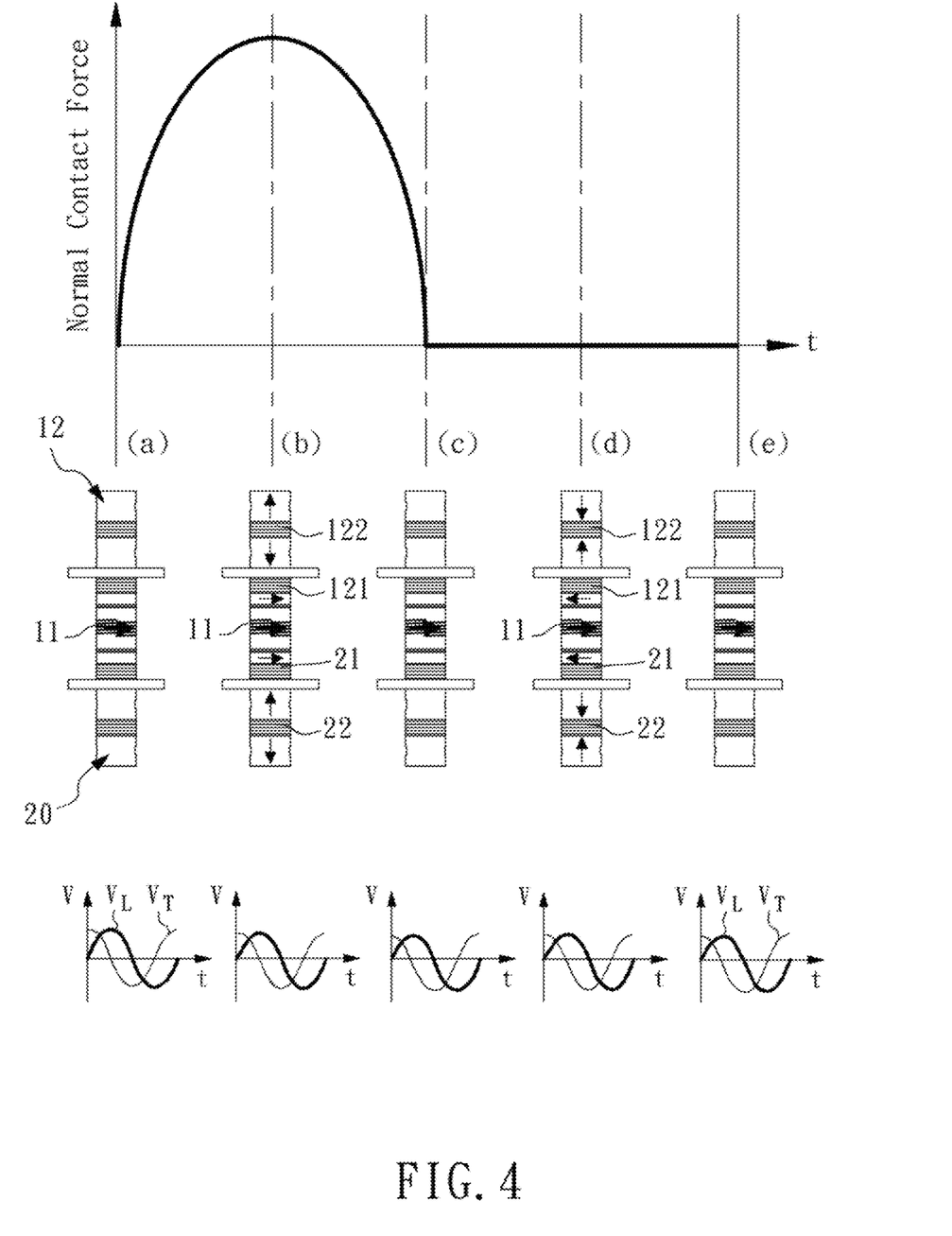
FIG. 4 is a diagram showing the output of the dual hybrid motor under the first control mode according to the embodiment in FIG. 1A.

As shown in FIG. 4, when the first stator 12 and the second stator 20 are driven, the first connecting element 13 is moved to compress the rotor 11 due to the stretching of the first longitudinal vibrator 122 and the second longitudinal vibrator 22. Meanwhile, the rotation from the first torsional vibrator 121 and the second torsional vibrator 21 drives the rotor 11 to rotate. As shown in FIG. 4, when the dual hybrid motor 1 operates under the first control mode, the first stator 12 and the second stator 20 of the dual hybrid motor 1 are driven by a pulse wave voltage with the same amplitude and phase. The pulse wave $V_L$ shown in FIG. 4 is the pulse wave applied to the first stator 12, the first longitudinal vibrator 122 and the second longitudinal vibrator 22 of the second stator 20. The pulse wave $V_T$ shown in FIG. 4 is the pulse wave applied to the first stator 12, the first torsional vibrator 121 and the second torsional vibrator 21 of the second stator 20, wherein the phase difference between $V_T$ and $V_L$ is 90°.

As shown by the arrow in FIG. 4, during the chronological sequence of the pulse voltages (periods a-e), the first stator 12, the first longitudinal vibrator 122 and the second longitudinal vibrator 22 of the second stator 20 can be stretched or contracted due to the piezoelectric effect. When the first longitudinal vibrator 122 and the second longitudinal vibrator 22 stretch, the first longitudinal vibrator 122 and the rotor 11 are compressed by the pushing from the second longitudinal vibrator 22 (period b). When the first longitudinal vibrator 122 and the second longitudinal vibrator 22 contract, the first longitudinal vibrator 122 and the second longitudinal vibrator 22 detach from the rotor (period d); the first longitudinal vibrator 122 and the second longitudinal vibrator 22 move back to their original positions and inertia rotation occurs. Thus, the maximum output can be obtained by applying a control signal to the first longitudinal vibrator 122 and the second longitudinal vibrator 22 and applying that to the second torsional vibrator 21 and the second longitudinal vibrator 22 with 90° of phase difference. FIG. 4 presents the contact force output. When the dual hybrid motor 1 operates under the first control mode, the output from the dual hybrid motor 1 presents only the first half period (periods a-c).

Figure 5:
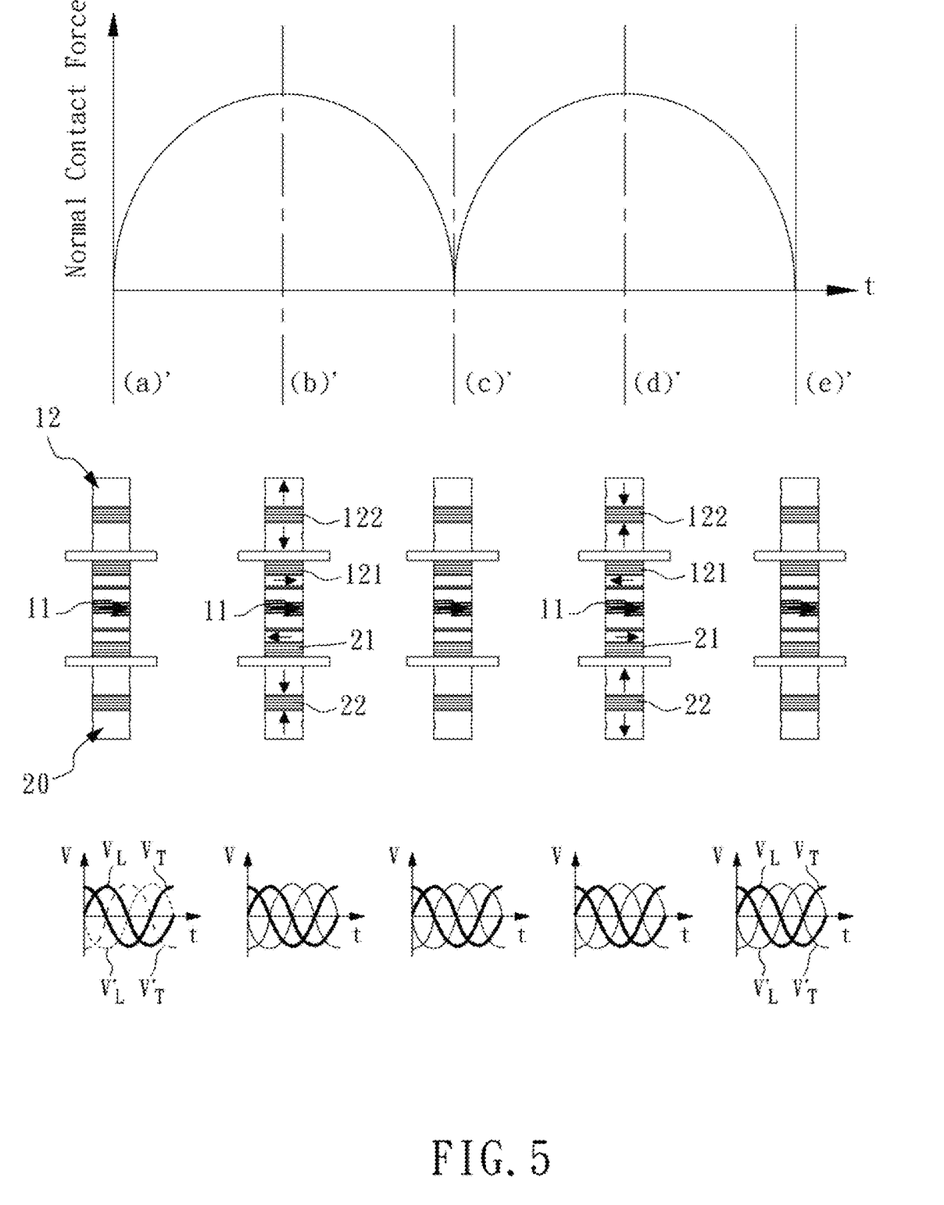
FIG. 5 is a diagram showing the output of the dual hybrid motor under the second control mode according to the embodiment in FIG. 1A.

As shown in FIG. 5, when the dual hybrid motor 1 operates under the second control mode, the first stator 12 and the second stator 20 are driven by a pulse voltage with the same amplitude but inverse phase. The V'$_L$ in FIG. 5 is applied to the first stator 12, the first longitudinal vibrator 122 and the second longitudinal vibrator 22 of the second stator 20. The V'$_T$ in FIG. 5 is applied to the first stator 12, the first torsional vibrator 121 and the second torsional vibrator 21 of the second stator 20, wherein the phase difference between V'$_T$ and the V'$_L$ is 90°. As shown by the arrow in FIG. 5, during the chronological sequence of the pulse voltages (periods a'-e'), the first stator 12, the first longitudinal vibrator 122 and the second longitudinal vibrator 22 of the second stator 20 can be stretched or contracted due to the piezoelectric effect. When the first longitudinal vibrator 122 stretches and the second longitudinal vibrator 22 contracts, the rotor 11 is compressed by the pushing from the first longitudinal vibrator 122 (period b'). When the first longitudinal vibrator 122 and the second longitudinal vibrator 22 move back to their original positions, inertia rotation occurs (period c'). When the first longitudinal vibrator 122 contracts and the second longitudinal vibrator 22 stretches, the first longitudinal vibrator 122 detaches from the rotor and then the rotor 11 is compressed by the pushing from the second longitudinal vibrator 22 (period d'). The contact force output is presented in FIG. 5. When the dual hybrid motor 1 operates under the second control mode, the dual hybrid motor 1 outputs during all periods (periods a'-e').

Figure 6:
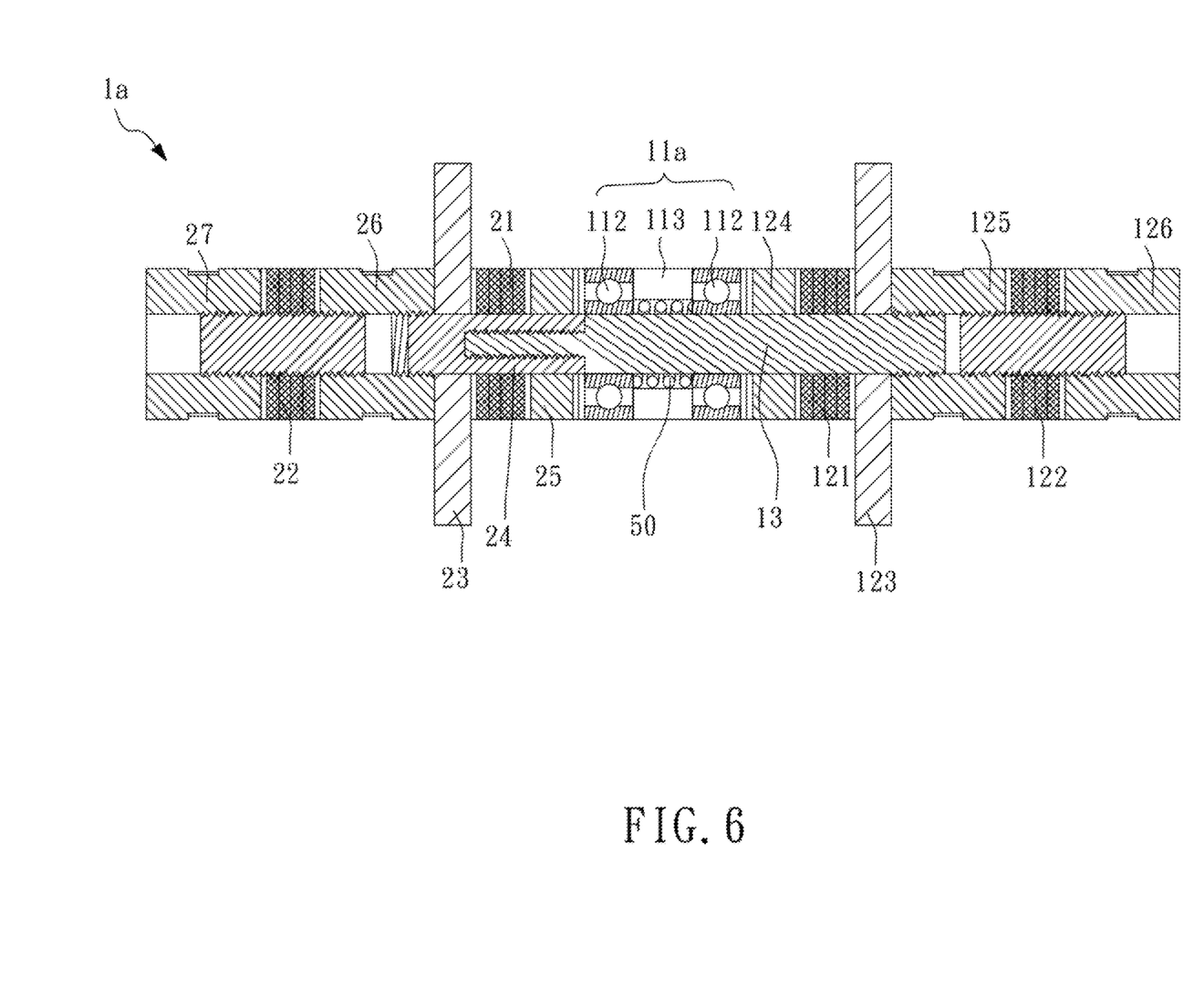
FIG. 6 is a schematic drawing showing a section view of a second embodiment of the dual hybrid motor.
Figure 7:
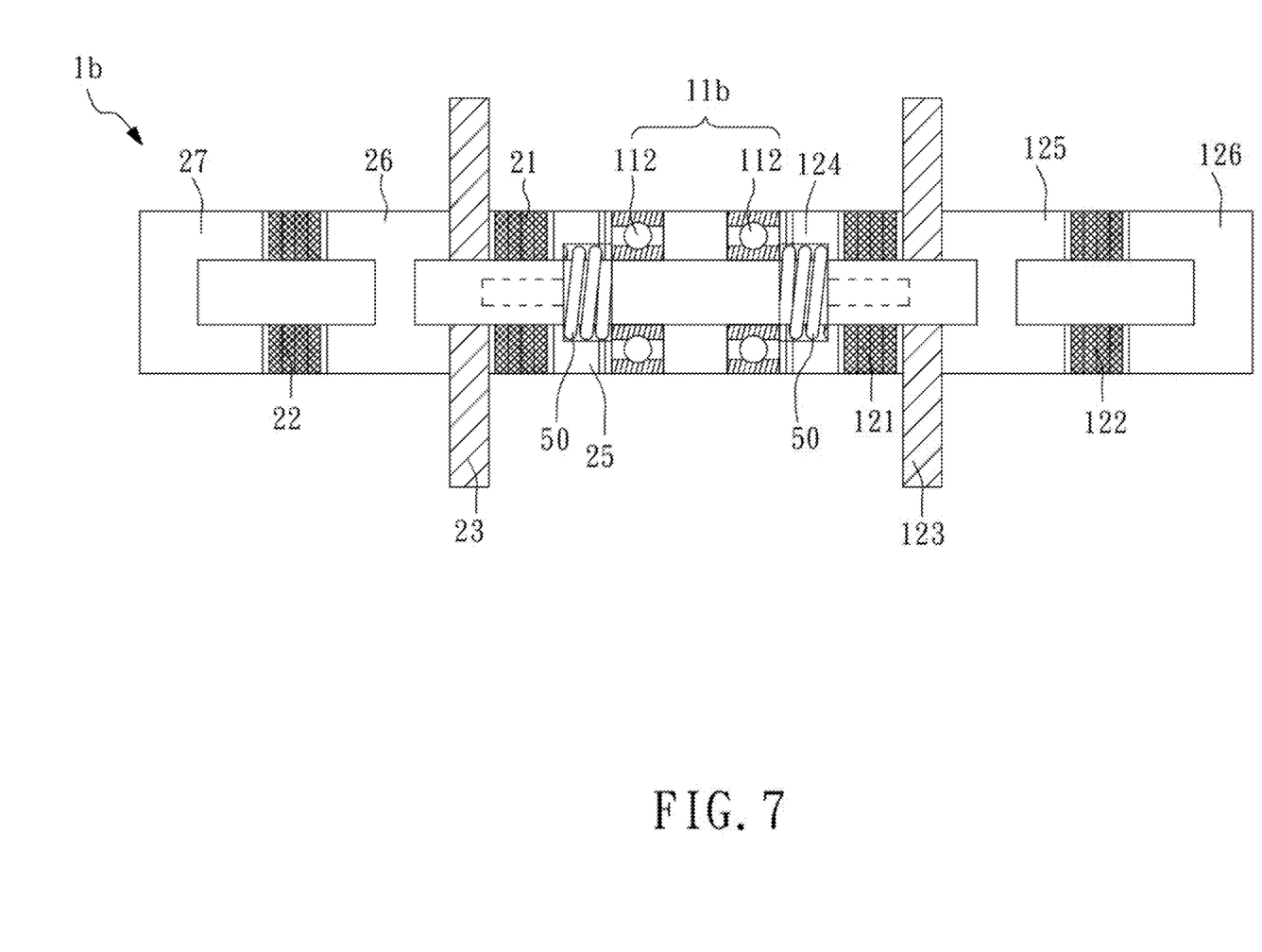
FIG. 7 is a schematic drawing showing a section view of a third embodiment of the dual hybrid motor.

Please refer to FIG. 6 and FIG. 7, which present a schematic drawing showing a section view of the second embodiment of the dual hybrid motor and a schematic drawing showing a section view of the third embodiment of the dual hybrid motor. As shown in FIG. 6, the dual hybrid motor 1a comprises two bearings 112, a shell 113 and a spring 50. The spring 50 is disposed within the rotor 11 and is situated within the shell 113 and between the two bearings 112. As shown in FIG. 7, the dual hybrid motor 1b comprises two bearings 112 and two springs 50. The two bearings 112 locate are located within the rotor 11; the two springs 50 are individually disposed within the first elastic blocks 124, 25 and between the rotor 11b.

According to the embodiment in FIG. 1A, the resonance frequency of the single hybrid motor 10 was analyzed with ANSYS with the length of the first elastic block 124=L2, the length of the second elastic block 125=L1, and the length of the third elastic block 126=L1. The results are presented as follows:

TABLE 1

| L1 (mm) | Resonance frequency (Hz) (longitudinal) | L2 (mm) | Resonance frequency (Hz) (torsional) |
|---|---|---|---|
| 15 | 28029.7 | 4 | 25504.5 |
| 16 | 27554.7 | 5 | 24568.8 |
| 17 | 26870.5 | 6 | 23708.9 |
| 18 | 26040.6 | 7 | 22595.3 |
| 19 | 25279.9 | 8 | 22179.9 |
| 20 | 24421.8 | 9 | 21496.1 |
| 21 | 23896.6 | 10 | 20858.3 |
| 22 | 23296.6 | 11 | 20261.6 |
| 23 | 22663.6 | 12 | 19701.8 |
| 24 | 21263.6 | 13 | 19175.5 |
| 25 | 20606.4 | 14 | 18679.5 |
| 26 | 20155.9 | 15 | 18211.2 |
| 27 | 19397.3 | 16 | 17768.16 |
| 28 | 18840.3 | 17 | 17348.1 |
| N/A | N/A | 18 | 16950.5 |
| N/A | N/A | 19 | 16574.6 |
| N/A | N/A | 20 | 16240.8 |
| N/A | N/A | 21 | 15846.4 |
| N/A | N/A | 22 | 15523.3 |
| N/A | N/A | 23 | 15210.1 |
| N/A | N/A | 24 | 14909.2 |

Figure 8:
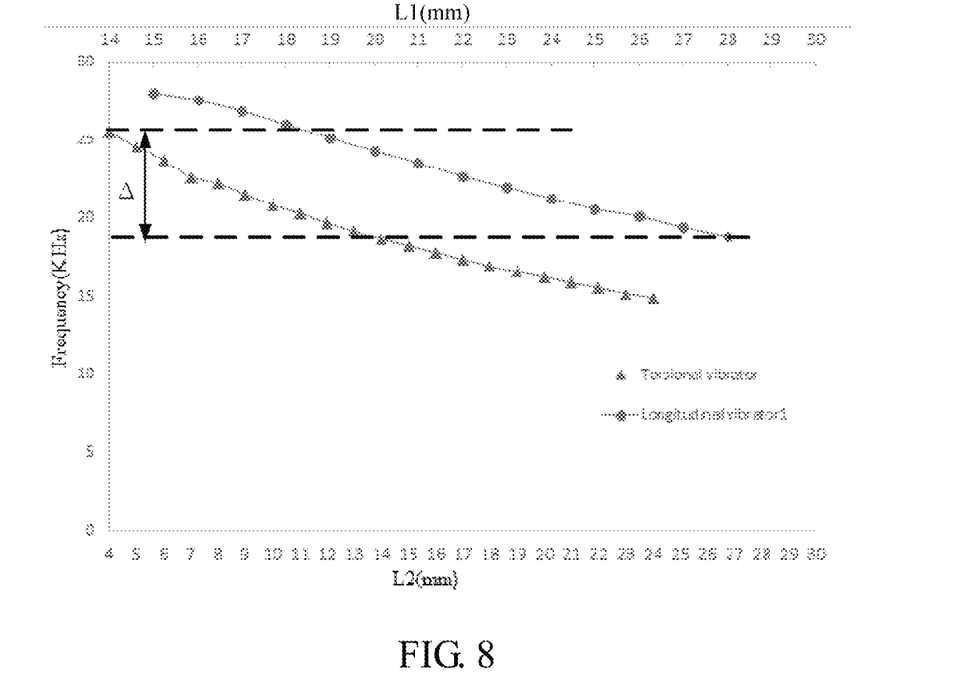
FIG. 8 is a diagram showing the length of the elastic block of the single hybrid motor according to FIG. 1A versus resonance frequencies.
Figure 9:
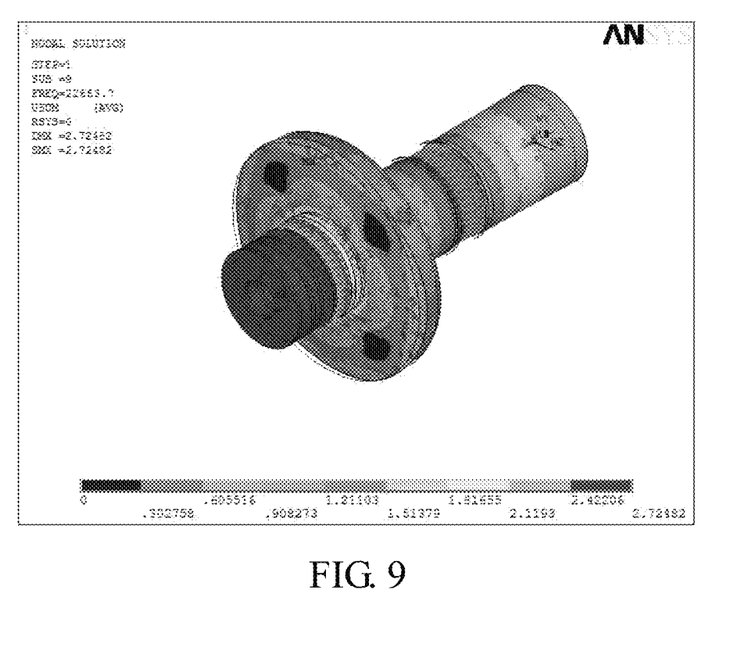
FIG. 9 is a diagram showing the model analysis of the longitudinal vibration of the single hybrid motor according to the embodiment in FIG. 1A.
Figure 10:
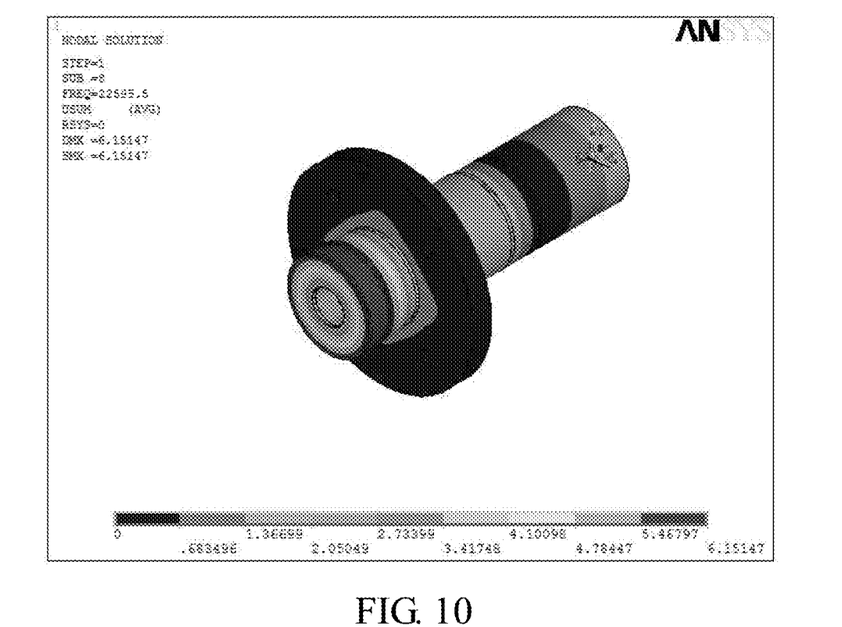
FIG. 10 is a diagram showing the model analysis of the torsional vibration of the single hybrid motor according to the embodiment in FIG. 1A.

Please refer to FIG. 8, which presents a diagram showing the resonance frequency versus the length of the elastic block. The degeneracy range of the single hybrid motor 10 is around 18~25 kHz, and the length of L1 is about 18 mm~28 mm. L2 is about 4 mm~13 mm. Therefore, multiple sets of resonance frequencies are available for driving the single hybrid motor 10. Taking L1=23 mm and L2=7 mm as an example, the model analysis of the longitudinal vibration of the single hybrid motor 10 by ANSYS is presented in FIG. 9. The model analysis of the torsional vibration is presented in FIG. 10.

According to the embodiment in FIG. 1A, the resonance frequency of the dual hybrid motor 1 was analyzed with ANSYS, with the length of the first elastic block 124, 25=L2, the second elastic block 125, 26=L1, and the third elastic block 126, 27=L1. The results are presented as follows:

TABLE 2

| L1 (mm) | Resonance frequency (Hz) (longitudinal) | L2 (mm) | Resonance frequency (Hz) (torsional) |
|---|---|---|---|
| 14 | 25300 | 4 | 22500 |
| 15 | 24300 | 5 | 21500 |
| 16 | 23300 | 6 | 20900 |
| 17 | 22500 | 7 | 20000 |
| 18 | 21900 | 8 | 19264 |
| 19 | 21502 | 9 | 19000 |
| 20 | 20900 | 10 | 18800 |
| 21 | 20260 | 11 | 18600 |
| 22 | 19733 | 12 | 18100 |
| 23 | 19413 | 13 | 17700 |
| 24 | 18462 | 124 | N/A |
| 25 | 17300 | 125 | N/A |

Figure 11:
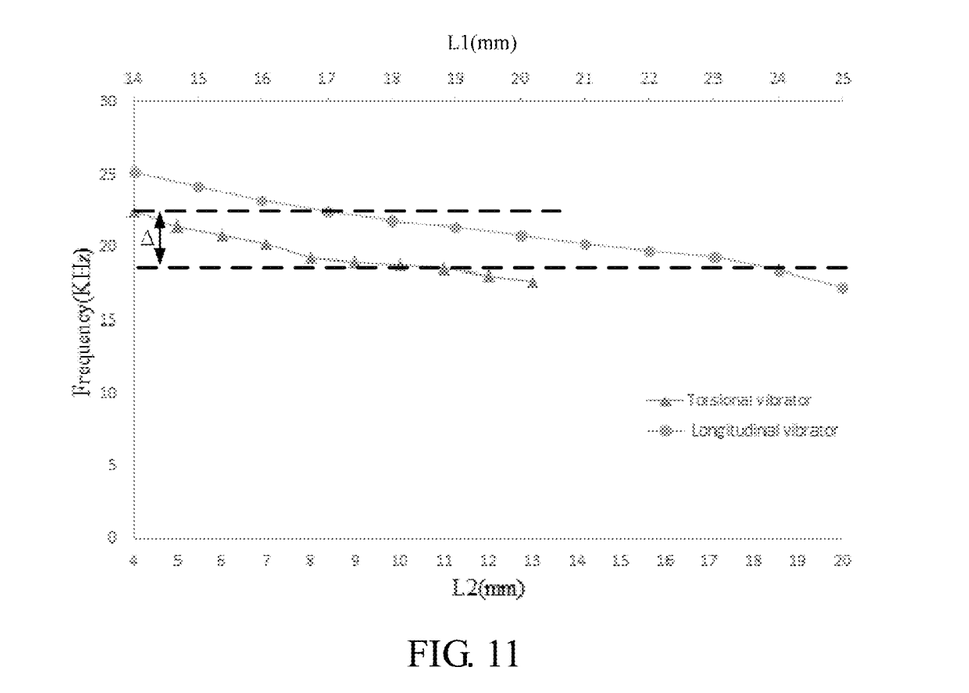
FIG. 11 is a diagram showing the length of the elastic block according to the embodiment in FIG. 1A versus the resonance frequencies.
Figure 12:
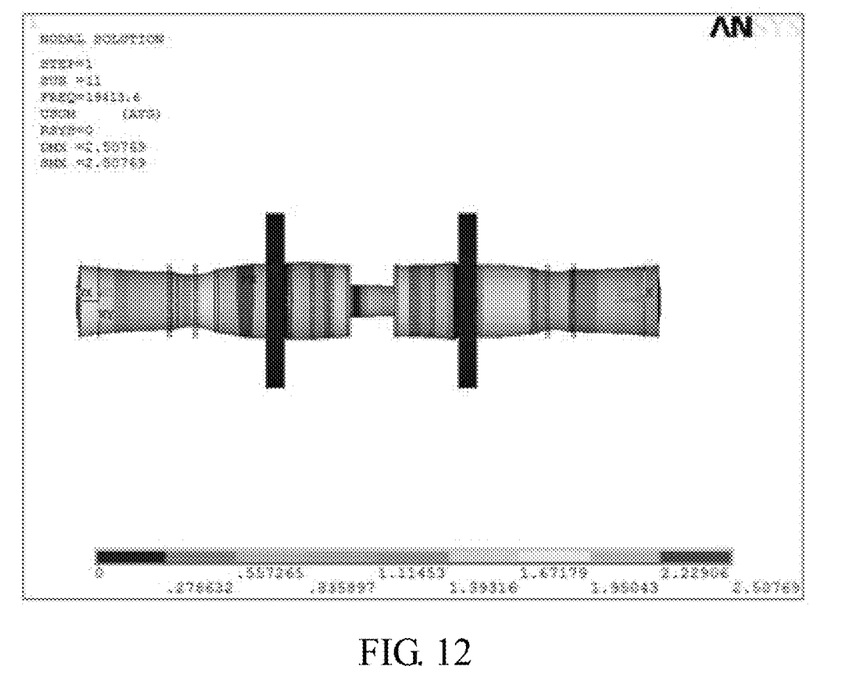
FIG. 12 is a diagram showing the model analysis of longitudinal vibration of the dual hybrid motor according to the embodiment in FIG. 1.
Figure 13:
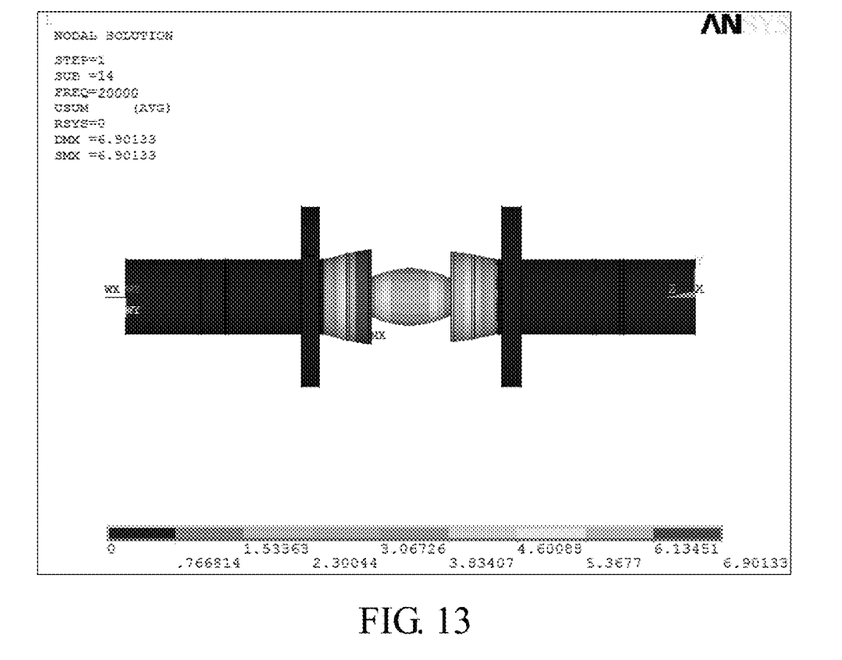
FIG. 13 is a diagram showing the model analysis of torsional vibration of the dual hybrid motor according to the embodiment in FIG. 1A.

Please refer to FIG. 11, which presents a diagram showing the resonance frequency versus the length of the elastic block. The degeneracy range of the dual hybrid motor 1 is around 19~23 kHz, the length of L1 is around 17~23 mm, and the length of L2 is about 4 mm to 10 mm. Therefore, there are multiple sets of resonance frequencies available for driving the dual hybrid motor 1. Taking L1=23 mm and L2=7 mm as an example, the model analysis of the longitudinal vibration of the dual hybrid motor 1 by ANSYS is presented in FIG. 12, and the model analysis of the torsional vibration is presented in FIG. 13.

Figure 14:
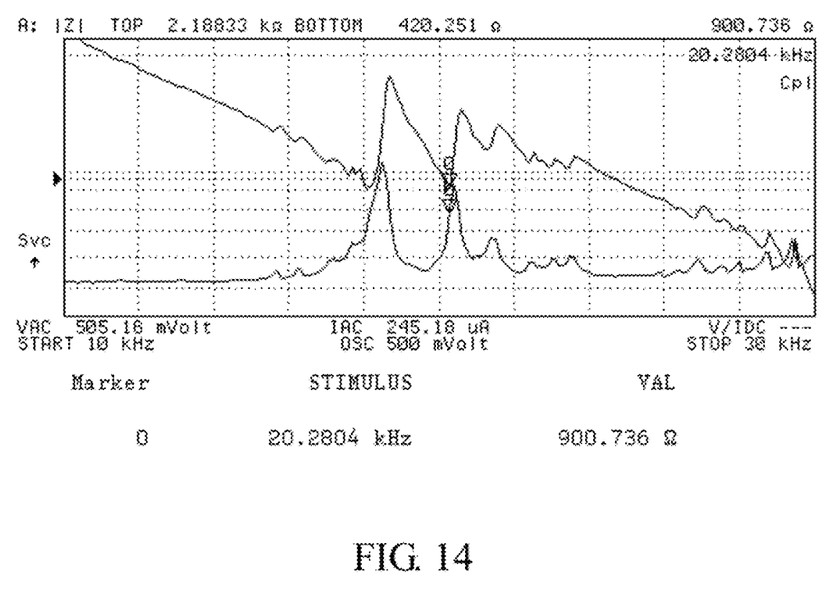
FIG. 14 is a diagram showing the frequencies of the longitudinal vibration of the dual hybrid motor in FIG. 1A, measured by an impedance analyzer and calculated by ANSYS.
Figure 15:
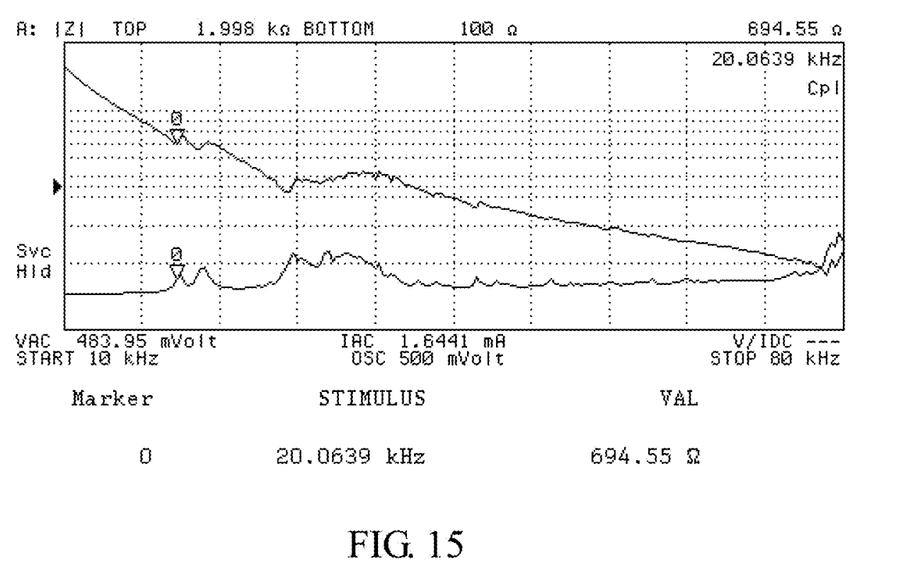
FIG. 15 is a diagram showing the frequencies of the torsional vibration of the dual hybrid motor in FIG. 1A, measured by an impedance analyzer and calculated by ANSYS.`

FIG. 14 is a diagram showing the frequencies of the longitudinal vibration of the dual hybrid motor 1 when L1=23 mm and L2=7 mm, as measured by an impedance analyzer. The frequency of the longitudinal vibration of the dual hybrid motor 1 measured by the impedance analyzer is 20.2 kHz, which is close to the result calculated by ANSYS, 19.4 kHz. FIG. 15 is a diagram showing the frequencies of the longitudinal vibration of the dual hybrid motor 1 when L1=23 mm and L2=7 mm, as measured by the impedance analyzer. The frequency of the torsional vibration of the dual hybrid motor 1 measured by the impedance analyzer is 20.06 kHz, which is close to the result calculated by ANSYS, 20 kHz. The above-presented data and diagrams presented above show that the structure of the present invention provides multiple sets of resonance frequencies and that the degeneracy process can be achieved easily.

According to the embodiment in FIG. 1A, the torsions and speeds measured by the torque motor when the dual hybrid motor 1 is operated under the first control mode/the second control mode are presented as Table 3 and Table 4.

TABLE 3

Torsions and speeds measured when the dual hybrid motor 1 operates under the first control mode.

| | experiment | | | | | | |
|---|---|---|---|---|---|---|---|
| | 1 | 2 | 3 | 4 | 5 | 6 | average |
| Torque (N-m) | 0.351 | 0.361 | 0.36 | 0.351 | 0.353 | 0.348 | 0.354 |
| Speed (rmp) | 34.7 | 34.4 | 35.7 | 34.6 | 34.89 | 37 | 35.2 |

TABLE 4

Torsions and speeds measured when the dual hybrid motor 1 operates under the second control mode.

| | experiment | | | | | | |
|---|---|---|---|---|---|---|---|
| | 1 | 2 | 3 | 4 | 5 | 6 | average |
| Torque (N-m) | 0.258 | 0.253 | 0.255 | 0.246 | 0.251 | 0.243 | 0.251 |
| Speed (rmp) | 44.82 | 48.16 | 44.75 | 45.9 | 45.8 | 46.5 | 45.9 |

Figure 16:
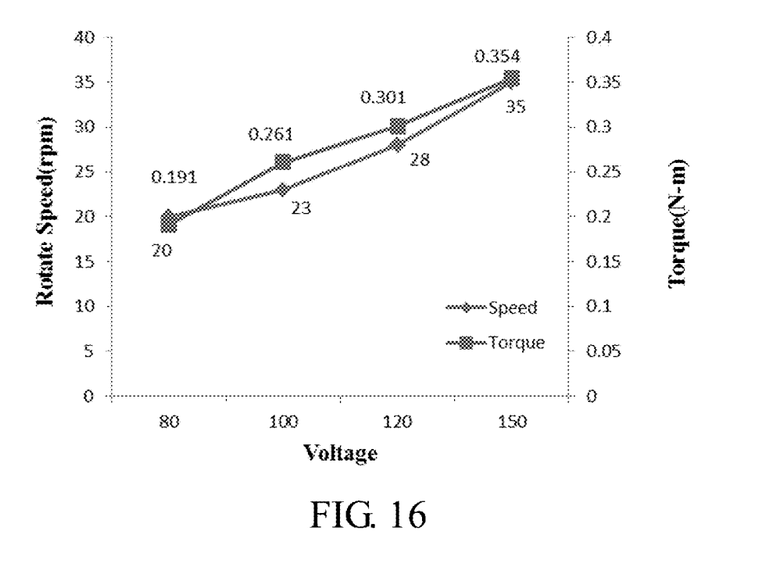
FIG. 16 is a diagram showing the output speed and output torsion of the embodiment of FIG. 1A driven by various driving voltages under the first control mode.
Figure 17:
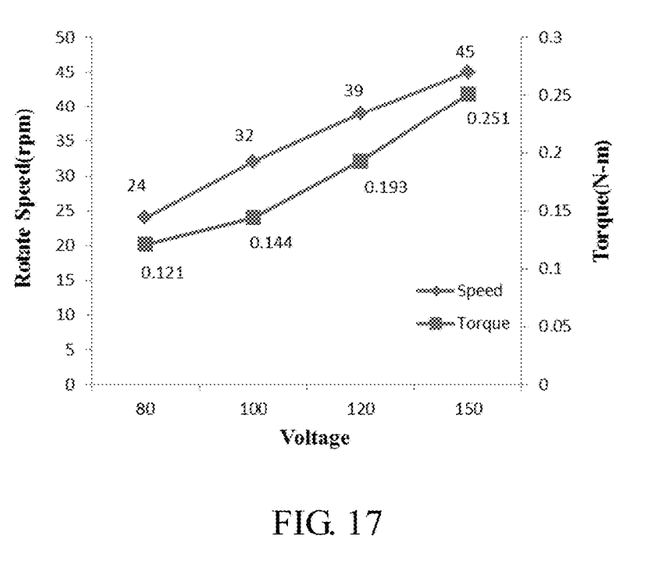
FIG. 17 is a diagram showing the output speed and output torsion of the embodiment of FIG. 1A driven by various driving voltages under the second control mode.
Figure 18:
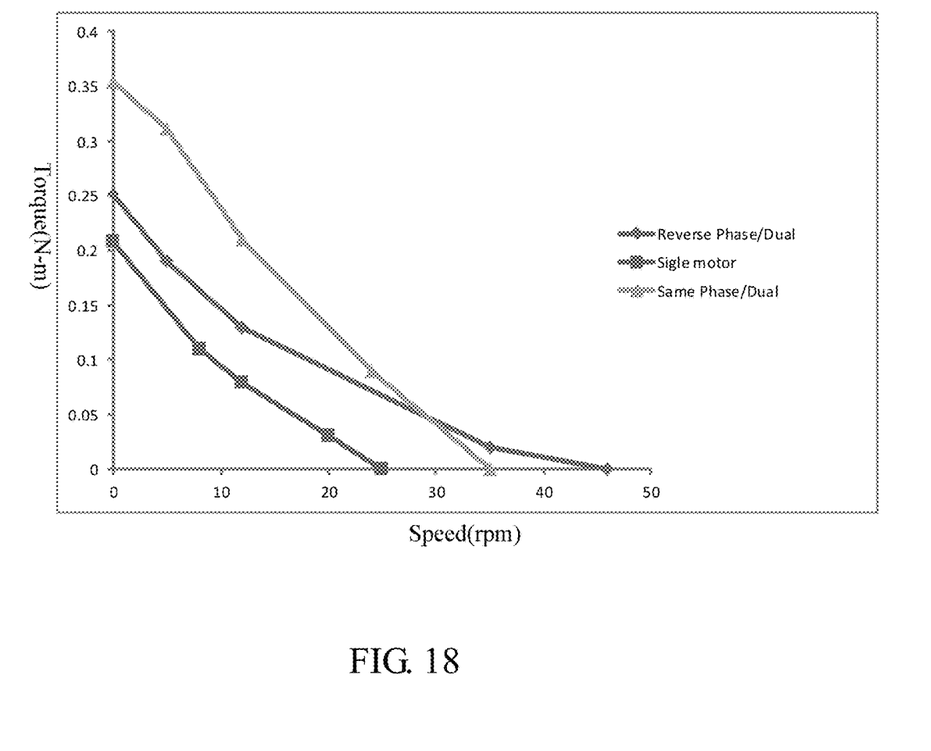
FIG. 18 is a diagram showing the output speed and output torsion of the dual hybrid motor under the first/second control modes as compared to those of the single hybrid motor.

Please refer to FIG. 16. FIG. 16 presents the output speed and output torsion data of the dual hybrid motor 1 operating under the first control mode presented in Table 2. FIG. 17 presents the output speed and output torsion data of the dual hybrid motor 1 operating under the second control mode. FIG. 18 presents a comparison of the output speed and output torsion of the dual hybrid motor 1 under the first/second control mode of the single hybrid motor 10. As shown in FIG. 18, the output speed and the output torsion of the dual hybrid motor 1 are both greater than those of the single hybrid motor 10, whether the dual hybrid motor 1 operates under the first or second control mode. As shown in FIG. 18, when the dual hybrid motor 1 operates under the first control mode (same phase/dual), the dual hybrid motor 1 has a maximum output torsion which is greater than that of the single hybrid motor 10. When the dual hybrid motor 1 operates under the second control mode (reverse phase/dual), the dual hybrid motor 1 has a maximum output speed which is greater than that of the single hybrid motor 10.

According to one embodiment of the present invention, the first stator 11 and the second stator 12 individually comprise a d15 torsional vibrator, a d33 longitudinal vibrator and a template. It is essential to identify the resonance frequencies between the longitudinal vibrato and the torsional vibrator, called degeneracy, for the operation of the dual hybrid motor 1. With the design of the template, the longitudinal vibrator and the torsional vibrator within the stator can be separated and the interference between the two can be reduced consequently. As a result, adjusting the length of the first elastic block or/and the second elastic block allows both the single hybrid motor 10 and the dual hybrid motor 1 to reach the degeneracy range and to obtain multiple sets of resonance frequencies available for driving the single hybrid motor 10 and the dual hybrid motor 1. As shown in FIG. 8 and FIG. 11, the degeneracy range of the single hybrid motor 10 and the degeneracy range of the dual hybrid motor 1 can be overlapped with a delicate design to facilitate the butting of a single hybrid motor 10 via the coupling 111 to another single hybrid motor 10 to form a dual hybrid motor 1, which can be driven by a resonance frequency chosen from the overlapped degeneracy range.

Furthermore, according to the design of the present invention, two different forms of control signals can be applied to the dual hybrid motor 1 to gain various outputs. One form is same phase control; i.e., control signals with same amplitude and phase are applied to the stators to obtain an output torsion nearly double that of output from the single hybrid motor. The other form is reverse phase control; i.e., control signals with 180° of phase difference are applied to the stators to obtain an output speed nearly double than that of the output from the single hybrid motor. The output torsion or the output speed of the dual hybrid motor 1 can be enhanced by applying different forms of driving signals.

With the structural design of the first stator 11 and the second stator 12, a range of resonance frequencies can be identified, and a dual hybrid motor 1 is formed by butting a single hybrid motor 10 with another stator or assembling two sets of single hybrid motors 10 to form a hybrid motor assembly for providing output torsion or output speed which are nearly twice those of the single hybrid motor 10. Thus, users can choose the high torsion output or high speed output according to various applications. More particularly, in the prior art, employing two sets of rotatable motors to drive a single axis could increase only the output torsion and not the output speed. However, with the reverse phase control disclosed in the present invention, output speed can be nearly doubled by applying control signals with 180° of phase difference.

As described above, the objectives, means, and effectiveness of the present invention differ from the characteristics of the prior art. It should be noted that the embodiment described above is for illustrating the principles and effects of the present invention and not for limiting the scope of the present invention. Any person skilled in the art should be able to make modifications and changes to the embodiments without departing from the technical principle and spirit of the present invention. The claims of the present invention within the scope of protection are described below.

What is claimed is:
1. A single hybrid motor comprising:
   a rotor; and a first stator disposed at a side of the rotor, the first stator comprising:
a first torsional vibrator;
a first longitudinal vibrator;
a first template located between the first longitudinal vibrator and the first torsional vibrator for separating the first longitudinal vibrator and the first torsional vibrator;
a first connecting element, an end of the first connecting element being connected to the rotor, the first torsional vibrator, the first longitudinal vibrator and the first template;
a first elastic block located between the rotor and the first torsional vibrator; and
a second elastic block located between the first template and the first longitudinal vibrator for adjusting a length of the first elastic block and/or a length of the second elastic block to allow the single hybrid motor to obtain a degeneracy range, wherein the degeneracy range has a plurality of sets of resonance frequencies available for driving the single hybrid motor.

2. The single hybrid motor as claimed in claim 1, wherein the length of the first elastic block is 4-10 mm and the length of the second elastic block is 17-23 mm.

3. A dual hybrid motor comprising:
a single hybrid motor as claimed in claim 1; and
a second stator detachably connecting to the single hybrid motor, wherein the second stator comprises:
a second torsional vibrator;
a second longitudinal vibrator;
a second template disposed between the second longitudinal vibrator and the second torsional vibrator for separating the second longitudinal vibrator and the second torsional vibrator; and
a second connecting element detachably connected to another end of the first connecting element, the second connecting element being connected to the second torsional vibrator, the second longitudinal vibrator and the second template; when the dual hybrid motor operates under a first control mode, an output torsion of the dual hybrid motor is greater than that of the single hybrid motor; when the dual hybrid motor operates under a second control mode, an output speed of the dual hybrid motor is greater than that of the single hybrid motor.

4. The dual hybrid motor as claimed in claim 3, wherein the first control mode refers to a same phase control in which control signals having the same phase are applied to the first stator and the second stator individually.

5. The dual hybrid motor as claimed in claim 3, wherein the second control mode refers to a reverse phase control in which control signals having 180° of phase difference are applied to the first stator and the second stator individually.

6. The dual hybrid motor as claimed in claim 3, wherein the second stator comprises a first elastic block disposed between the rotor and the second torsional vibrator and the second stator comprising a second elastic block disposed between the second template and the second longitudinal vibrator; adjusting a length of the first elastic block and/or a length of the second elastic block allows the degeneracy range of the second torsional vibrator and the second longitudinal vibrator of the second stator to overlap with the degeneracy range of the single hybrid motor to obtain a plurality of sets of resonance frequencies available for driving the dual hybrid motor.

7. The dual hybrid motor as claimed in claim 6, wherein the length of the first elastic block is 4-10 mm and the length of the second elastic block is 17-23 mm.

8. The dual hybrid motor as claimed in claim 7, wherein both the first stator and the second stator each comprise a third elastic block, and the two third elastic blocks are individually disposed at an end of the first longitudinal vibrator which is away from the first template and at an end of the second longitudinal vibrator which is away from the second template.

9. The dual hybrid motor as claimed in claim 3, wherein the second connecting element is a hollow bolt, and the hollow bolt covers at least a portion of the first connecting element.

10. A hybrid motor assembly comprising a plurality of the single hybrid motors as claimed in claim 1, wherein each of the other ends of the first connecting elements butt with each other.

* * * * *